United States Patent
Kabuki et al.

(10) Patent No.: US 8,070,340 B2
(45) Date of Patent: Dec. 6, 2011

(54) LIGHT GUIDING MEMBER AND LINEAR LIGHT SOURCE APPARATUS

(75) Inventors: Kiyoyuki Kabuki, Hyogo (JP); Hiroshige Hata, Hyogo (JP); Koichi Kamei, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 493 days.

(21) Appl. No.: 12/289,106

(22) Filed: Oct. 21, 2008

(65) Prior Publication Data

US 2010/0097792 A1  Apr. 22, 2010

(51) Int. Cl.
*F21V 7/04* (2006.01)

(52) U.S. Cl. .................. 362/551; 362/297; 362/346

(58) Field of Classification Search .......... 362/551, 362/552, 555, 558, 217.01, 217.05, 297, 362/298, 301, 346, 347
See application file for complete search history.

(56) References Cited

U.S. PATENT DOCUMENTS

| | | | |
|---|---|---|---|
| 5,359,691 A | 10/1994 | Tai et al. | |
| 5,980,054 A | 11/1999 | Fukui et al. | |
| 6,337,946 B1 * | 1/2002 | McGaffigan | 385/146 |
| 6,727,963 B1 | 4/2004 | Taniguchi et al. | |
| 7,478,941 B2 * | 1/2009 | Wu et al. | 362/612 |
| 7,530,719 B2 * | 5/2009 | Yamashita et al. | 362/600 |
| 2002/0039292 A1 | 4/2002 | Matsui | |
| 2009/0109704 A1 * | 4/2009 | Chen et al. | 362/626 |

FOREIGN PATENT DOCUMENTS

| | | | |
|---|---|---|---|
| JP | 06-324217 A | 11/1994 | |
| JP | 07-104132 A | 4/1995 | |
| JP | 09-163080 A | 6/1997 | |
| JP | 10-039302 A | 2/1998 | |
| JP | 11-052370 A | 2/1999 | |
| JP | 2000-227522 A | 8/2000 | |
| JP | 2002-107720 A | 4/2002 | |

OTHER PUBLICATIONS

Japanese Office Action issued Jul. 27, 2011 for corresponding Japanese Application No. 2007-116001.

* cited by examiner

*Primary Examiner* — Thomas Sember
(74) *Attorney, Agent, or Firm* — Rader, Fishman & Grauer PLLC (57) ABSTRACT

A light guiding member in a shape of a rod shape comprises a light receiving portion formed on an end thereof in an axial direction thereof, and a knurled recess portion which extends in the axial direction, is formed on a side face thereof, wherein the knurled recess portion has two or more recesses, a side face of each recess in a light receiving portion side is a reflective surface, the reflective surface of at least one of the recesses having a primary reflective surface and a secondary reflective surface.

13 Claims, 7 Drawing Sheets

LIGHT GUIDING MEMBER AND LINEAR LIGHT SOURCE APPARATUS

CROSS-REFERENCES TO RELATED APPLICATION

The disclosure of Japanese Patent Application No. 2007-116001, filed Apr. 25, 2007 including its specification, claims and drawings, is incorporated herein by reference in its entirety.

TECHNICAL FIELD

Described herein are a light guiding member and a linear light source apparatus, which are used for a light source for lighting of an image reading apparatus such as a facsimile, a copying machine, an image scanner, a bar code reader, etc. or are used for a light source for edge lighting of back light of a liquid crystal panel in which a light guiding member is used.

BACKGROUND

In recent years, in an image reading apparatus, such as a personal facsimile, small light emitting diodes (hereinafter referred to as an LED) with a low power are starting to be used as a light source of a reading light source apparatus, due to improvements in an output of such LEDs and a raise in the sensitivity of a CCD type sensor as a light receiving element. In a conventional linear light source apparatus equipped with such LEDs as light sources, the number of the light sources is reduced and a light guiding member in which light emitted from the light source enters the light guiding member and the light is guided towards a desired direction, is used so as to obtain uniform lighting intensity.

Figure 8:
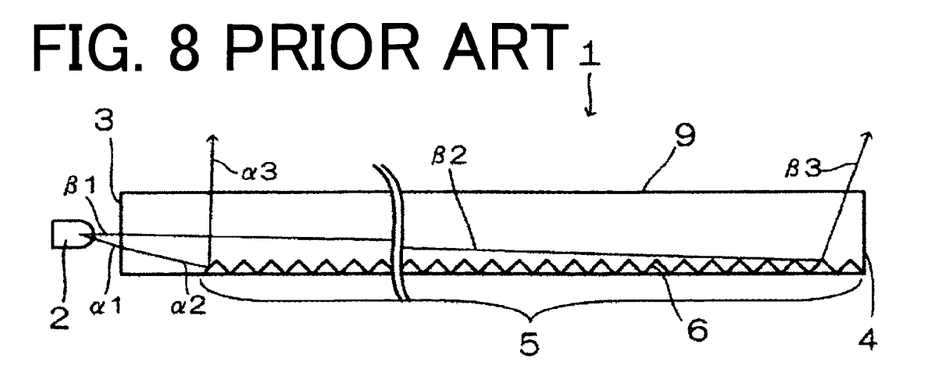
FIG. 8 is a cross sectional view of the structure of a conventional linear light source apparatus.

FIG. 8 is a diagram showing the structure of a linear light source apparatus disclosed in Japanese Laid Open Patent No. H09-163080 as a conventional linear light source apparatus. The linear light source apparatus is equipped with a light guiding member 1 which is made of transparent resin etc., and a light source 2 which is made up of LEDs. A light receiving section 3 is formed at one end of the light guiding member 1 in an axial direction thereof, and a flat and smooth face 4, on which a reflective film is formed, is provided at the other end thereof. The light source 2 is arranged so as to face the light receiving section 3. Moreover, knurled recess portion 5 is formed so as to extend in the axial direction on an outer circumferential surface of the light guiding member 1 which is in an opposite side to a light emission side of the light guiding member 1. The cut-out direction of recesses of the knurled recess portion 5 is perpendicular to the axial direction. The recesses are in a shape of isosceles triangle in a cross sectional view thereof, taken along in the axial direction. Light emitted from the light source 2 enters the inside of the light guiding member 1 from the light receiving section 3, and the light is repeatedly reflected within the light guiding member 1, and is then reflected on reflective surfaces 6 of the knurled recesses 5, so as to be emitted from the light guiding member 1 with predetermined angles.

Of components of light emitted from the light source 2, a light ray al of the light with a large incident angle to the light receiving section 3 is reflected on a reflective surface 6 of one of the knurled recesses 5 near the light receiving section 3 (a light ray α2). Since the light ray α1 with the large incident angle to the light receiving section 3, is incident on the reflective surface 6 of the recess of the knurled recess portion 5 at a small incident angle (the light ray α2), a light ray α3 is emitted from the light guiding member 1 at an output angle which is approximately perpendicular thereto (slightly inclining in the direction of the flat and smooth face 4). On the other hand, of the components of the light emitted from the light source 2, a light ray β1 whose incident angle with respect to the light receiving section 3 is small, propagates along the axial direction of the light guiding member 1, and is reflected on a reflective surface 6 of another recess of the knurled recess portion 5 which is distant from the light receiving section 3 and near the flat and smooth face 4 (a light ray β2). Since the light ray β1 with the small incident angle with respect to the light receiving section 3 is incident on the reflective surface 6 of the recess of the knurled recess portion 5 at a large incident angle (a light ray β2), a light β3 is emitted from the light guiding member 1 with an angle, inclining in a direction of the flat and smooth face 4.

Figure 9:
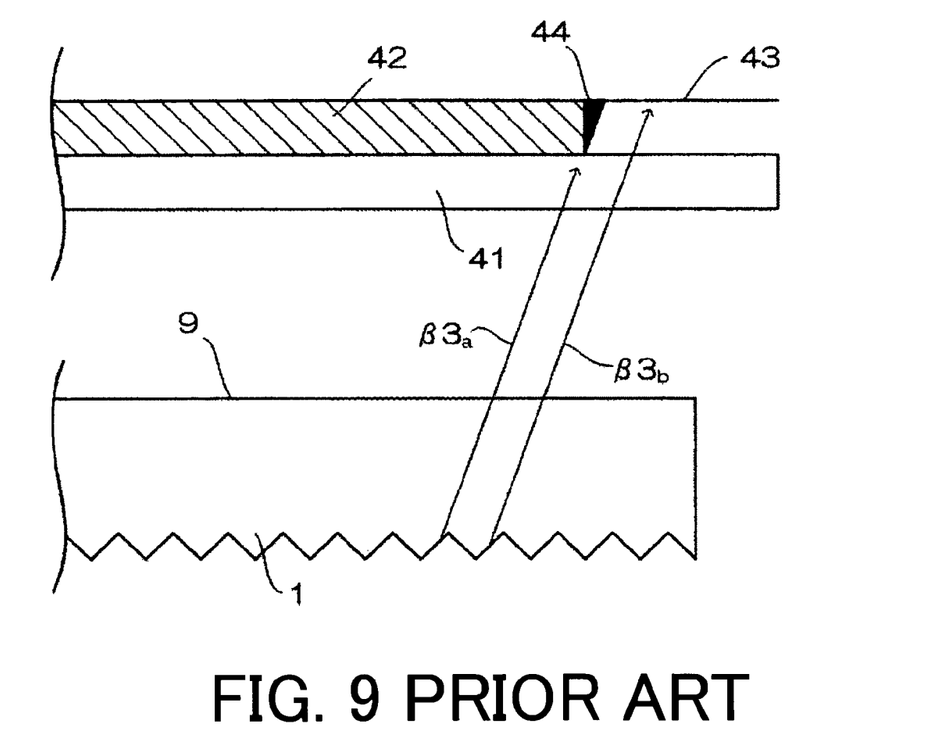
FIG. 9 is a partial cross sectional view of an image reading apparatus, showing a state where light rays are irradiated to a reading object.

However, in the linear light source apparatus shown in FIG. 8, since the light β3 is outputted at an angle, inclining in the direction of the flat and smooth face 4, a black line may appear in a scanned image. FIG. 9 is a partial cross sectional view of the image reading apparatus, wherein an object 42 to be scanned and light rays are shown for explanation of a shadow 44. A platen glass 41, which is made of an optical permeability material, is provided in the image reading apparatus so as to face a light emitting face 9 of the linear light source apparatus. The reading object 42 to be scanned, which has an image thereon, is placed on the platen glass 41, when it is used. Light emitted from the light emitting face 9 of the light guiding member 1 is irradiated to the platen glass 41, so that a projection image of the reading object 42 is scanned, so as to form a reading image. When the reading object 42 having a thickness such as a book etc. is scanned, a gap is produced between a face of the reading object 42 to be irradiated, and a document cover 43. Since the reading object 42 does not transmit light, a light ray $β3_a$ which irradiates an end portion of the reading object 42 does not irradiate the document cover 43. Although the light ray $β3_b$ which is slightly shifted in the axial direction from the light ray $β3_a$ which irradiates the end portion of the reading object 42, irradiates the document cover 43, since the light $β3_b$ has an angle, a portion to be irradiated thereby is shifted in the axial direction from the edge of the reading object 42, that is, the document cover 43 is irradiated. Therefore, a shadow 44 is produced between the light $β3_a$ and the light $β3_b$, since the light is not irradiated there, so that a black line appears in a reading image. Moreover, a similar thing happens when there is difference in level such as a folded line, in the reading object 42.

In view of the problem, the present light guiding member and a linear light source apparatus emit light so that a black line may not appear in a reading image, even when there is a gap or a level difference in a reading object.

One of aspects thereof is a light guiding member in a shape of a rod shape comprising: a light receiving portion formed on an end thereof in an axial direction thereof; and a knurled recess portion which extends in the axial direction, is formed on a side face thereof, wherein the knurled recess portion has two or more recesses, a side face of each recess in a light receiving portion side is a reflective surface, and the reflective surface of at least one of the recesses having a primary reflective surface and a secondary reflective surface.

The secondary reflective surface may be formed at an end of the primary reflective surface in the axial direction, and an inclination angle of the secondary reflective surface may be larger than that of the primary reflective surface.

Further, at least one of the recesses may have a reflective surface, a flat surface and a light transmissive face, and the light transmissive face may comprise a primary light transmissive face and a secondary light transmissive face.

Moreover, the primary light transmissive face may be formed at an end of the secondary light transmissive face, and an inclination angle of the secondary transmissive face may be larger than that of the primary light transmissive face.

Moreover, at least one of the recesses may have a reflective surface, a flat surface and a light transmissive face, and the flat surface may incline counterclockwise from the axial direction.

Widths of flat faces in the axial direction may be shorter as away from the light receiving portion to the flat and smooth face.

Depths of the recesses are larger as close to the flat and smooth face from the light receiving portion.

One of the two or more recesses of the knurled recess portion may have a one face reflective surface made up of one face, and another one of the two or more recesses of the knurled recess portion may have a two face reflective surface made up of a primary reflective surface and a secondary reflective surface.

The one of the two or more recesses of the knurled recess portion which has the one face reflective surface, and the another one of the two or more recesses of the knurled recess portion which has the two face reflective surface made may be formed by turns.

Another aspect of the present light guiding member and a linear light source apparatus is a liner light source apparatus comprising: the above-mentioned light guiding member; and a light source provided so as to face the light receiving portion of the light guiding member.

In the present light guiding member and the linear light source apparatus, since the reflective surface of the recess of the knurled recess portion has the primary reflective surface and the secondary reflective surface, the light rays having two angles which are different in the axial direction can be directed to a reading object and emitted from the linear light source apparatus, so that even when there is a gap or a level difference in a reading object, a shadow is not produced on the document cover, whereby a black line does not appear in the reading image.

BRIEF DESCRIPTION OF THE DRAWINGS

Other features and advantages of the present light guiding member and linear light source apparatus will be apparent from the ensuing description, taken in conjunction with the accompanying drawings, in which.

DESCRIPTION

The descriptions in the specification are provided for illustrative purposes only, and are not limiting thereto. An appreciation of various aspects of the present light guiding member and the present linear light source apparatus are best gained through a discussion of various examples thereof. The meaning of these terms will be apparent to persons skilled in the relevant arts based on the entirety of the teachings provided herein.

Figure 1:
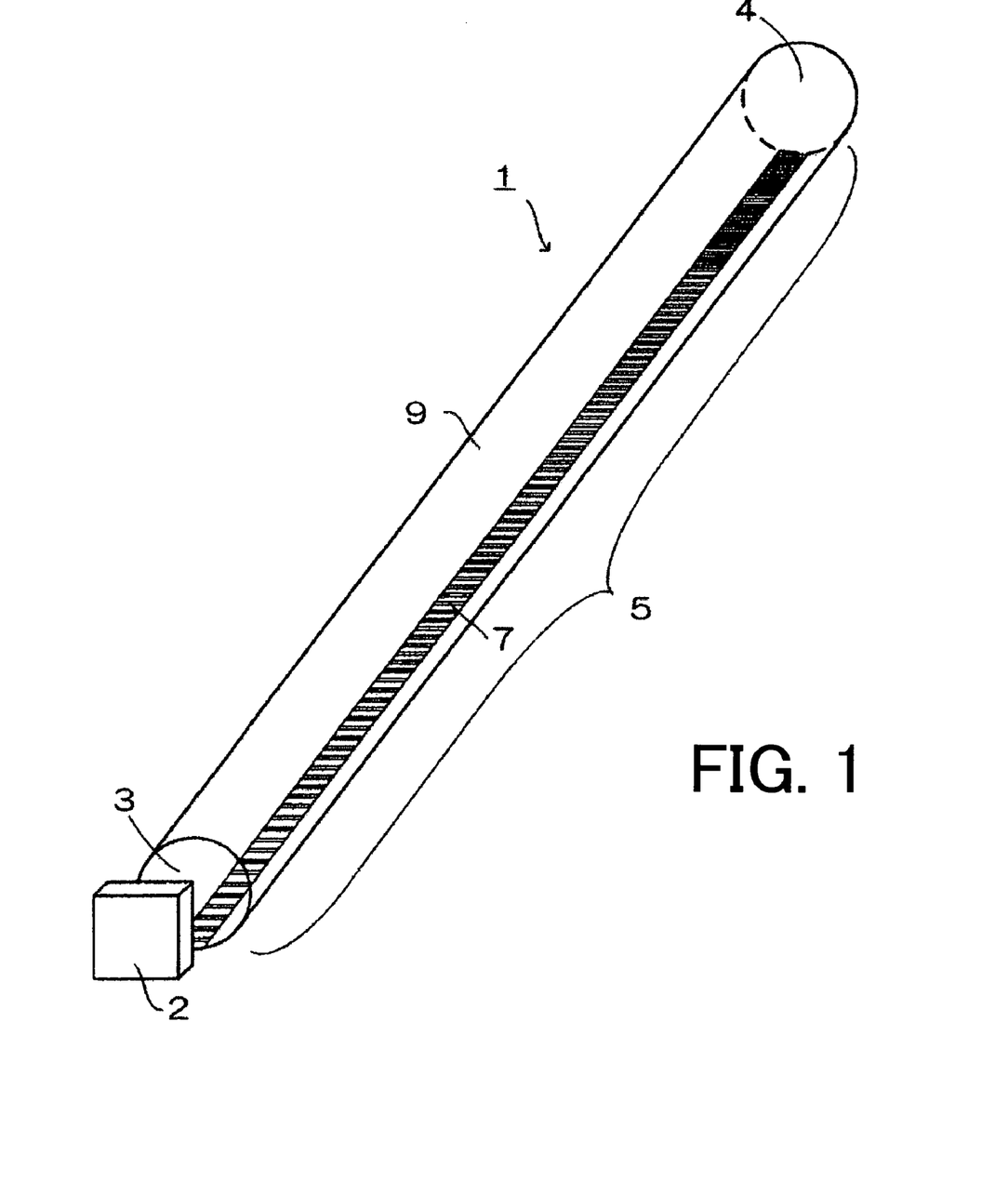
FIG. 1 is a perspective view showing the structure of a linear light source apparatus according to an embodiment.

A first embodiment of the present light guiding member and linear light source apparatus will be described below. FIG. 1 is a perspective view showing the structure of a linear light source apparatus according to the embodiment. The linear light source apparatus is equipped with a light guiding member 1 which is made of transparent resin etc., and a light source 2 which is made up of an LED(s). The light guiding member 1 is a cylindrical part, wherein a light receiving section 3 is provided in one end in an axial direction of the light guiding member 1, and a flat and smooth face 4 is formed on the other end thereof. A knurled recess portion 5 which extends in the axial direction is formed on an outer circumferential surface of the light guiding member 1, which serves as a side face of the light guiding member 1, and the knurled recess portion 5 faces a light emitting face 9. A plurality of recesses 7 of the knurled recess portion 5 whose cut part direction is perpendicular to the axial direction of the light guiding member 1, is formed.

The light source 2 consists of a package made of resin, in which one or more blue LED elements are arranged. The blue LED(S) is fixed thereto by mold material, and is sealed and protected from the outside air. The blue light from the blue LED(s) is changed to white light by a phosphor layer. In addition, although generally LED elements vary in optical output, in case where two or more LED elements are arranged in the light source 2, the optical output of the light source 2 is not affected by the optical output of each LED element, so that constant optical output can be maintained. The light source 2 is arranged so as to face the light receiving section 3.

The light which is emitted from the light source 2 has a lambertian type luminous intensity distribution, and is irradiated towards the light guiding member 1. When the light emitted from the light source 2 enters the high refraction medium, the light is refracted, thereby becoming light with a small angle according to the Snell's law. For example, where the light emitted from the light source 2 enters the light guiding member 1 having a refractive index n=1.49 through the air, when the incidence plane thereof is a face vertical to the central axis of the light guiding member 1, even if light whose incident angle is 89 degrees, the incident angle of the light inclines by 42 degrees with respect to the axis of the light guiding member 1, i.e., the incident angle to the side of the light guiding member 1 (the outer circumferential surface), is 48 degrees, thereby exceeding the critical angle. Therefore, when the side of the light guiding member 1 is a mirror surface and is parallel to the axis, the light which enters the light guiding member 1 is totally reflected and is guided without a loss.

Figure 2:
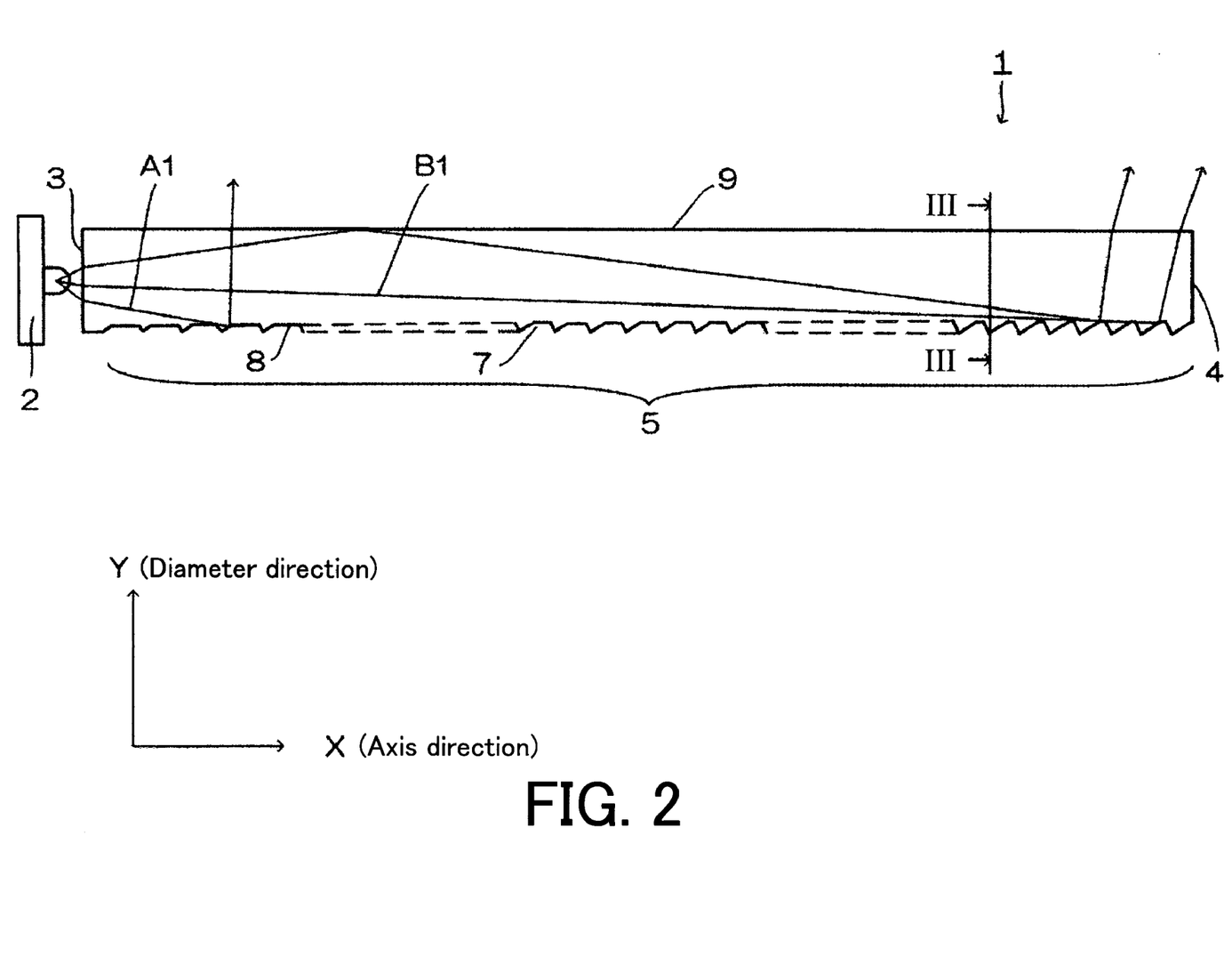
FIG. 2 is an enlarged sectional view of a linear light source apparatus according to an embodiment, taken along in an axial direction thereof.

FIG. 2 is an enlarged sectional view of a linear light source apparatus according to the embodiment, taken along in the axial direction X thereof. In the knurled recess portion 5, a plurality of recesses 7, each of which extends perpendicular to the axial direction X of the light guiding member and is cut in the diameter direction Y which is directed from a light emitting face 9 to the knurled recess portion 5, are formed, and further a flat face 8 is formed at a top of a part between adjacent recesses 7. Since the light intensity of light which is guided inside the light guiding member 1 decreases as it is away from the light receiving section 3, the widths of the flat faces 8 in the axial direction X are made shorter as away from the light receiving section 3, so as to make the light intensity reflected on the knurled recess portion 5, uniform entirely in the axis direction. Moreover, in order to make light intensity more uniform, the depths in the diameter direction Y of the recesses 7 become large, as close to the flat and smooth face 4 from the light receiving section 3. In addition, the width of the recesses may be made wider.

The light which enters the light guiding member 1 from the light source 2 reaches the knurled recess portion 5, while being reflected on the inner wall of the light guiding member 1. When the incident angle to a reflective surface 6 exceeds the critical angle, the light is totally reflected, and propagates toward the light emitting face 9, so as to be emitted to the outside of the light guiding member 1. A light ray A1 with a large incident angle to the light receiving section 3 is reflected on a reflective surface 6 of the knurled recess portion 5 which is located near the light receiving section 3. Since the incident angle to the reflective surface 6 of the knurled recess portion 5 is small, the incidence light A1 is totally reflected in a direction almost perpendicular to the light emitting face 9. A light ray B1 with a small incident angle to the light receiving section 3 propagates along the axial direction X of the light guiding member 1, and is reflected on a reflective surface 6 of the knurled recess portion 5 which is located away from the light receiving section 3 and near the flat and smooth face 4. Since the incident angle to the reflective surface 6 of the knurled recess portion 5 is large, the incidence light ray B1 is reflected with an angle, inclining to the axial direction X which extends from the light receiving section 3 to the flat and smooth face 4.

Figure 3:
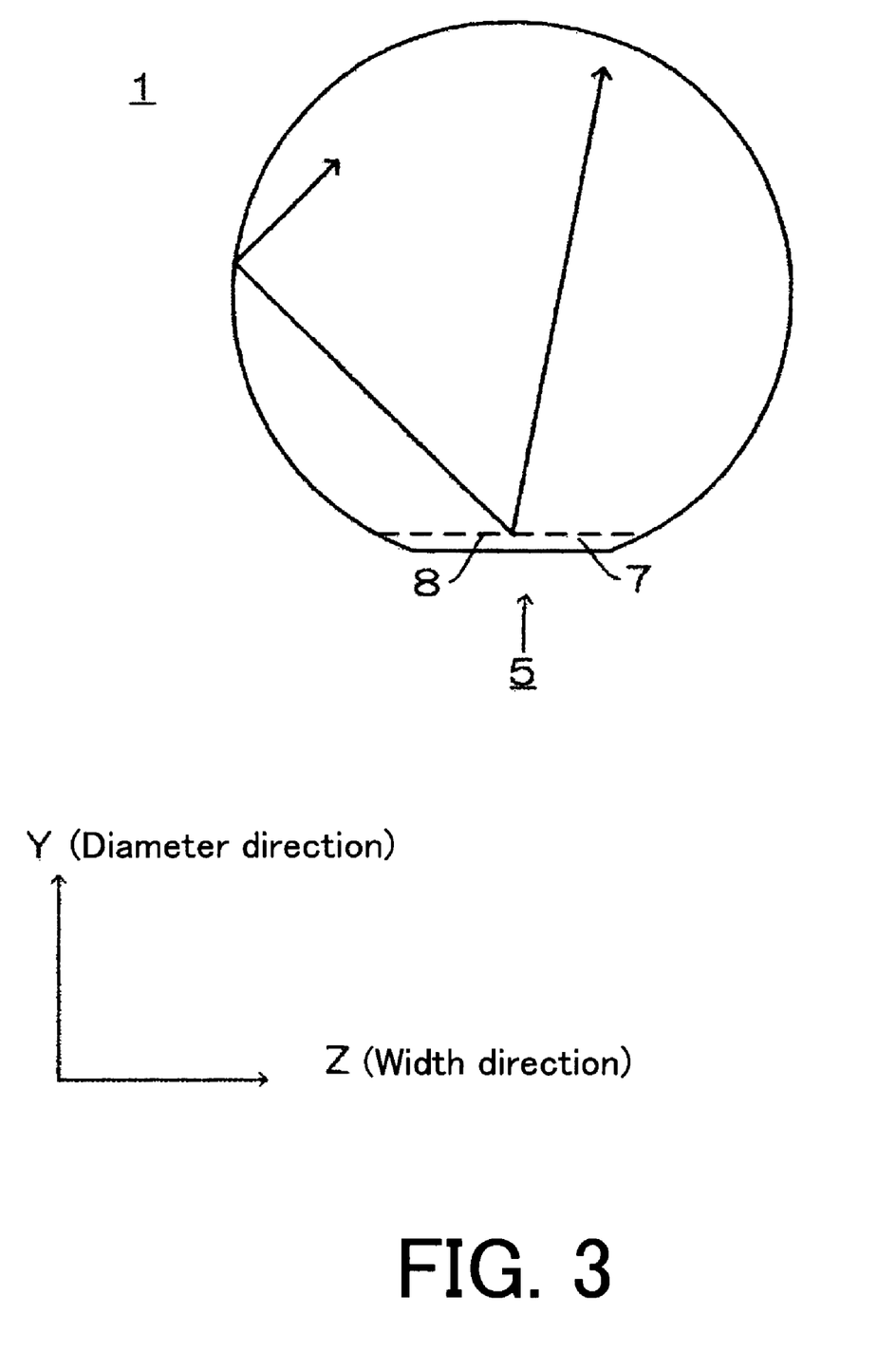
FIG. 3 is a cross sectional view of a light guiding member according to an embodiment, taken along a line III-III of FIG. 2 in a diameter direction.

FIG. 3 is a projection drawing (cross sectional view) of the light guiding member 1 according to the embodiment, taken along a line III-III in a diameter direction Y, which is shown in FIG. 2. Solid lines show the shape of the light guiding member 1, and a broken line shows the recesses 7 of the knurled recess portion 5. The light guiding member 1 is not a perfect round shape in the cross sectional view in a diameter direction thereof, and includes a straight line section in part. When the light guiding member 1 is seen in whole, a horizontal face extending in the axial direction is formed on the outer circumferential surface. The knurled recess portion 5 is formed in the plane face. This is because the recesses can be more easily processed with high precision on the horizontal plane face. The knurled recess portion 5 has the recesses 7 whose cut portions having the same depth in the diameter direction Y are formed in the width direction Z. The recess 7 has approximately a trapezoid shape in the cross sectional plan view in the diameter direction Y and the width direction Z.

Figure 4:
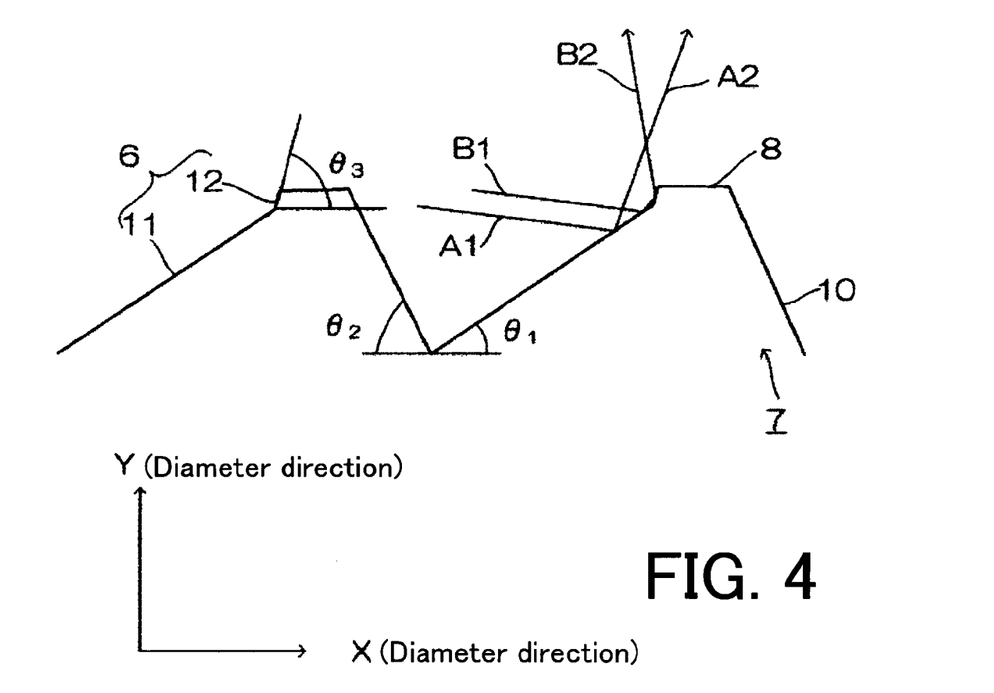
FIG. 4 is an enlarged cross sectional view of recesses of a knurled recess portion of the light guiding member according to an embodiment.

FIG. 4 is an enlarged cross sectional view of recesses 7 of the knurled recess portion 5 of the light guiding member according to the embodiment, taken along the axial direction X. A side face of each recess 7 in a light receiving section 3 side forms a reflective surface 6, and a side face in a side of the flat and smooth face 4 forms a light transmissive face 10. The reflective surface 6 consists of a primary reflective surface 11 and a secondary reflective surface 12, and the secondary reflective surfaces 12 is formed in an end portion of the primary reflective surface 11 in the axial direction X. The primary reflective surfaces 11 formed by the respective recesses 7 denting in the diameter direction Y are arranged in the axial direction X from the light receiving section 3 to the flat and smooth face 4. The secondary reflective surfaces 12 are formed, following the respective primary reflective surfaces 11, and the flat faces 8 are formed following the respective secondary reflective surfaces 12. Light transmissive faces 10 which project in the counter direction of the diameter direction Y is formed, following the respective flat face 8. That is, in the recess portion 7, the primary reflective surface 11, the secondary reflective surface 12, the flat face 8, and the light transmissive face 10 are formed in that order in the axial direction X.

A primary reflective surface inclination angle $\theta_1$ is angle between a horizontal line which extends in the axis direction X from an intersection of a primary reflective surface 11 and a light transmissive face 10, and the primary reflective surface 11 which is rotated counterclockwise. A light transmissive face angle inclination $\theta_2$ is formed between a horizontal line in a counter direction, which is located in a position where the above mentioned horizontal line in the axial direction X is rotated clockwise by 180 degrees around the intersection of the primary reflective surface and the light transmissive face, and the light transmissive face 10. A secondary reflective surface inclination angle $\theta_3$ is an angle between a horizontal line which extends in the axial direction X from an intersection of a primary reflective surface 11 and the secondary reflective surface 12, and the secondary reflective surface 12 which is located at a position where the horizontal line is rotated counterclockwise. In order to totally reflect and guide at least half or more of light emitted from the light source 2, by the light guiding member 1, it is necessary to totally reflect the light which is emitted at 45 degrees from the light source 2, i.e., the light having 28 degree inclination to the axis of the light guiding member 1 therein. Therefore, the inclination angle $\theta_1$ of the primary reflective surface 11, is formed so as to be 20 degrees near the light receiving section 3. Moreover, the inclination angle $\theta_2$ of the light transmissive face 10 is formed so as to be 28 degrees or more so that light with 28-degree inclination may not be incident thereon.

The inclination angle $\theta_3$ of the secondary reflective surface 12 is larger than the inclination angle $\theta_1$ of the primary reflective surface 11. For this reason, there is a case where a light ray (light component) reflected on the primary reflective surface 11 is reflected on the secondary reflective surface 12 again. A light ray A1 which is incident on a portion of the primary reflective surface 11 which is located away from the secondary reflective surface 12, is reflected as a light ray A2 with an angle inclining to the axial direction X. On the other hand, a light ray B1 which is incident and reflected on a portion of the primary reflective surface 11 which is adjacent to the secondary reflective surface 12 is reflected again on the secondary reflective surface 12, so as to form a light ray B2 with an angle inclining to the counter direction of the axial direction X. If the inclination angle $\theta_3$ is set to 75-90 degrees, the light ray B2 emitted therefrom propagates in a desirable direction. Since the reflective surface 6 is made up of the primary reflective surface 11 and the secondary reflective surface 12, even if light rays A1 and B1 which go inside the light guiding member in one direction from the light source, are guided therein, it is possible to form the light A2 and the light B2 which is reflected on the reflective surface 6 and propagates in the two directions. In order that rate of the light intensity of the light A2 and that of the light B2 may be made suitable, it is desirable to suitably configure the height of the secondary reflective surface 12, so that approximately half of the light with inclination of 15-20 degrees may be incident on the secondary reflective surface 12.

Figure 5:
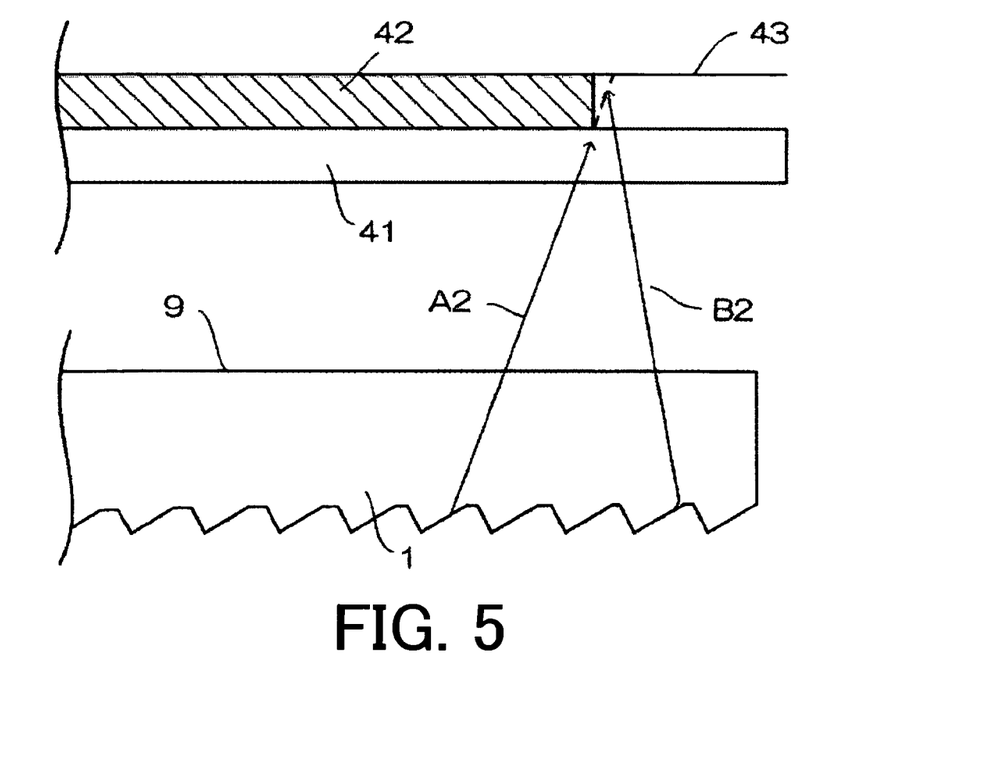
FIG. 5 is a partial cross sectional view of an image reading apparatus, wherein light rays are irradiated to a reading object.

FIG. 5 is a partial cross sectional view of an image reading apparatus, wherein the light ray A2 and the light ray B2 are irradiated to a reading object 42. The light rays A2 and B2 which are reflected on the reflective surface 6 shown in FIG. 4 go through the light emitting face 9, and is emitted therefrom to the outside of the light guiding member 1, thereby irradiating the reading object 42 shown in FIG. 5. In the image reading apparatus, the platen glass face 41 made of optical permeability material faces the light emitting face 9 of the linear light source apparatus, and the reading object 42 having an image to be scanned is placed on the platen glass face 41, when it is used. The light emitted from the light emitting face 9 of the light guiding member 1 is irradiated to the platen glass face 41. The image reading apparatus is used by placing the reading object 42 having an image to be scanned, on the platen glass face 41, and a projection image of the reading object 42 placed on the platen glass face 41 is scanned, thereby forming a reading image. When the reading object 42 is an object having a thickness, such as a book etc., a gap is produced between the light irradiation face of the reading object 42 and the document cover 43. Since the reading object 42 does not transmit light, when the light ray A2 which inclines in the axis direction X irradiates an end portion of the reading object 42, it does not irradiate the document cover 43. However, since the light ray B2 with an angle component inclining to the counter direction of the axial direction X, can irradiate the part which cannot be irradiated by the light ray A2 on the document cover 43, the shadow, which was produced since light was not irradiated, is not produced. A similar thing happens when there is difference in level such as a folded line, in the reading object 42. Therefore, since the reflective surface 6 of the recess portion 7 of each knurled recess is formed of the primary reflective surface and the secondary reflective surface, the light having two angle components which are different from each other in an axial direction X can be directed to a reading object so as to be emitted from the linear light source apparatus, so that even when there is a gap or a level difference in the reading object 42, a shadow is not produced on the document cover, whereby a black line does not appear in the reading image.

Figure 6:
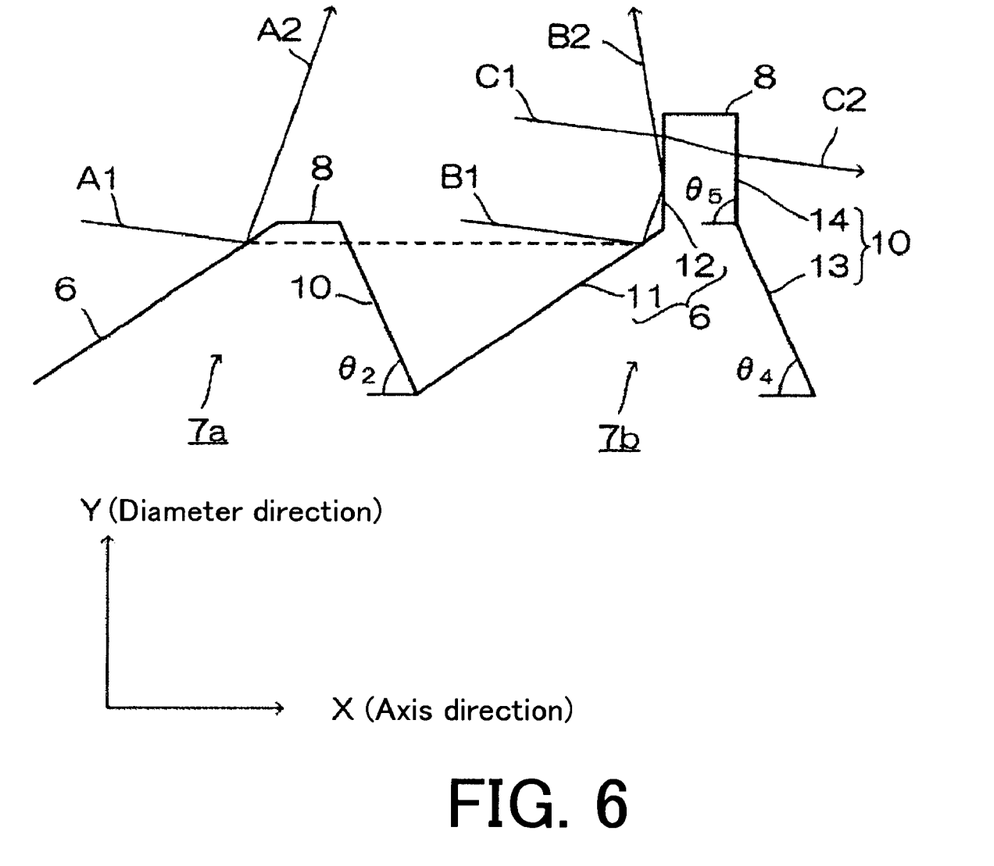
FIG. 6 is an enlarged sectional view of recesses of a knurled recess portion of a light guiding member according to an embodiment.

A second embodiment of the present light guiding member and linear light source apparatus will be described below. FIG. 6 is an enlarged sectional view of recesses 7 of a knurled recess portion 5 of a light guiding member 1 according to the embodiment. The shapes of the recesses 7 of the knurled recess portion 5 in the linear light source apparatus according to the second embodiment differ from that according to the first embodiment. A recess portion 7a having a reflective surface 6 which is formed as one face, and a recess 7b having the reflective surface 6 made up of a primary reflective surface 11 and a secondary reflective surface 12, are formed by turns. The recess 7b has a rectangle shape recess which dents in a diameter direction Y, from a portion corresponding to a flat face 8 of the recess portion 7a. That is, a secondary reflective surface 12 formed in the recess portion 7b has a denting length in the diameter direction Y, and has a surface area larger than that of the secondary reflective surface 12 of the first embodiment. Moreover, a light transmissive face 10 formed in the recess 7b also made up of a primary light transmissive face 13 and a secondary light transmissive face 14. An inclination angle $\theta_4$ of the primary light transmissive face 13 is an angle formed when rotating clockwise a line in the counter direction of an axial direction X to the primary light transmissive face 13, and is approximately the same as that of the inclination angle $\theta_2$ of the light transmissive face 10 of the recess portion 7a. The secondary light transmissive face 14 is provided so as to face the secondary reflective surface 12. An inclination angle $\theta_5$ of the secondary light transmissive face 14 is an angle formed when rotating clockwise a line in the counter direction of the axial direction X to the secondary light transmissive face 14, and is larger than the inclination angle $\theta_4$ of the primary light transmissive face 13.

The recess 7a, has, in an axial direction X, a reflective surface 6 which dents in a diameter direction Y is formed, and a flat face 8 which is formed, following the reflective surface 6, and a light transmissive face 10 which projects in the counter direction of a diameter direction Y, following the flat face 8. That is, the reflective surface 6, the flat face 8, and the light transmissive face 10 are formed in the axial direction X in that order, in the recess portion 7a. On the other hand, the primary reflective surface 11 of the recess 7b, which dents in the diameter direction Y, is arranged, inclining in the axial direction X. The secondary reflective surface 12 is formed, following the primary reflective surface 11. The flat face 8 of the recess 7b is formed, following the secondary reflective surface 12. The second light transmissive face 10 which projects in the counter direction of the diameter direction Y is formed, following the flat face 8. The first light transmissive face 13 is formed, following the second light transmissive face 14. That is, the primary reflective surface 11, the secondary reflective surface 12, the flat face 8, the secondary light transmissive face 14, and the first light transmissive face 13 are formed in that order in the axial direction X, in the recess portion 7b.

A light ray A1 which is incident on the reflective surface 6 of the recess 7a is reflected thereon as a light ray A2 with an angle inclining to the axial direction X. On the other hand, a light ray B1 which is incident on the primary reflective surface 11 of the recess 7b is reflected thereon and is mostly reflected again on the secondary reflective surface 12 as a light ray B2 with an angle inclining to the counter direction of the axial direction X, without depending on the incident angle to or an incidence position at the primary reflective surface 11, by making the denting length (depth) in the diameter direction Y of the secondary reflective surface 12 large. Although the height at which the light A1 is incident on the reflective surface 6 is approximately the same as that at which the light B1 is incident on the primary reflective surface 11 of the secondary reflective surface 7b, the reflected light rays A2 and B2 propagates in directions different from each other. Moreover, a light ray C1 which is irradiated to the recess portion 7b at a position higher than that of the light rays A1 and B1, is incident on the secondary reflective surface 12. Since the inclination angle of the secondary reflective surface 12 is large, the incident angle of the light C1 becomes smaller than the critical angle, the light C1 goes through the secondary reflective surface 12. The transmitted light of the light C1 again enters inside the light guiding member from the secondary transmissive face 14, and turns into a light ray C2 guided in the axial direction X.

Thus, since the recess 7a having the reflective surface 6 which is made up of one face, and the recess 7b having the reflective surface 6 made up of the primary reflective surface 11 and the secondary reflective surface 12, are formed by turns, even if the light rays A1 and B1 which go inside the light guiding member 1 in one direction from the light source is guided, it is possible to emit the light rays A2 and B2 in two directions to the reading object 42, wherein the light ray A2 is reflected on the reflective surface 6 of the recess 7a, and the light ray B2 is reflected on the primary reflective surface 11 of the recess 7b and the secondary reflective surface 12, whereby an angle component of the light ray A2 and that of the light ray B2 are different from each other in the axial direction X. Moreover, since the light ray C1 which goes through the secondary reflective surface 12 also again enters the inside of the light guiding member 1, so as to turn into the light C2 which is guided in the axial direction X, the light can be used efficiently. In addition, the recess 7a having the reflective surface 6 which is made up of one face was formed, and the recess portion 7b having the reflective surface 6 which is made up of the primary reflective surface 11 and the secondary reflective surface 12 is not necessarily formed by turns, that is, a suitable number of recesses 7b, each having a reflective surface 6 which is made up of the primary reflective surface 11 and the secondary reflective surface 12, may be inserted in a plurality of recesses 7a, each having a reflective surface 6 which is made up of one face, so as to form the knurled recess portion 5. Moreover, in reverse, a plurality of recesses 7a may be inserted in recesses 7. In order to prevent a shadow of an end portion of a reading object generated on a document cover, it is possible to partially form a recess(es) 7b having the reflective surface 6 which is made up of the primary reflective surface 11 and the secondary reflective surface 12, that is, only in part of the recesses 7 of the knurled recess portion 5 in a side of the flat and smooth face 4 in the axial direction X of the light guiding member 1.

Figure 7A:
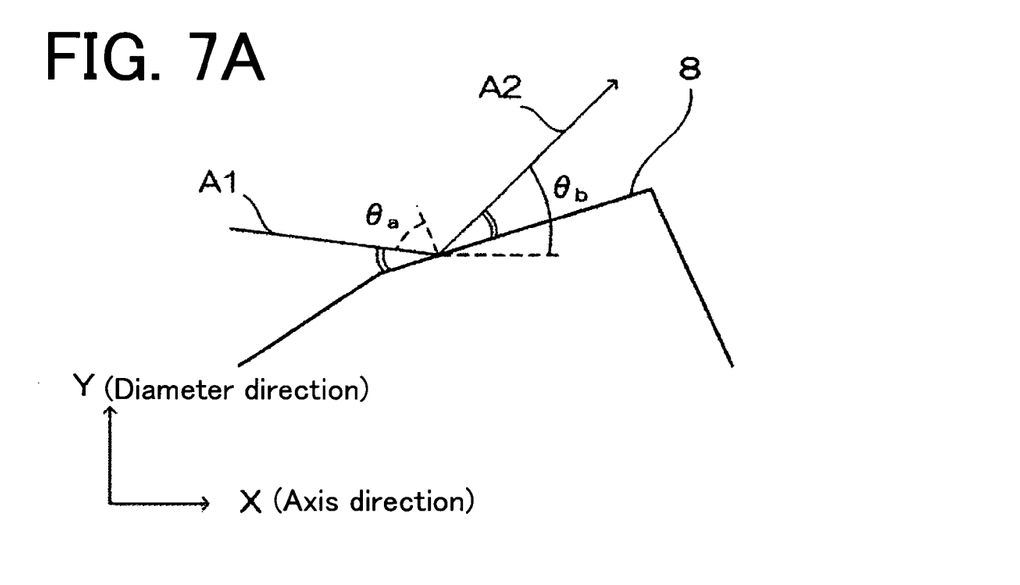
FIGS. 7A and 7B are partial enlarged sectional views of a recess of a knurled recess portion of a light guiding member according to an embodiment.
Figure 7B:
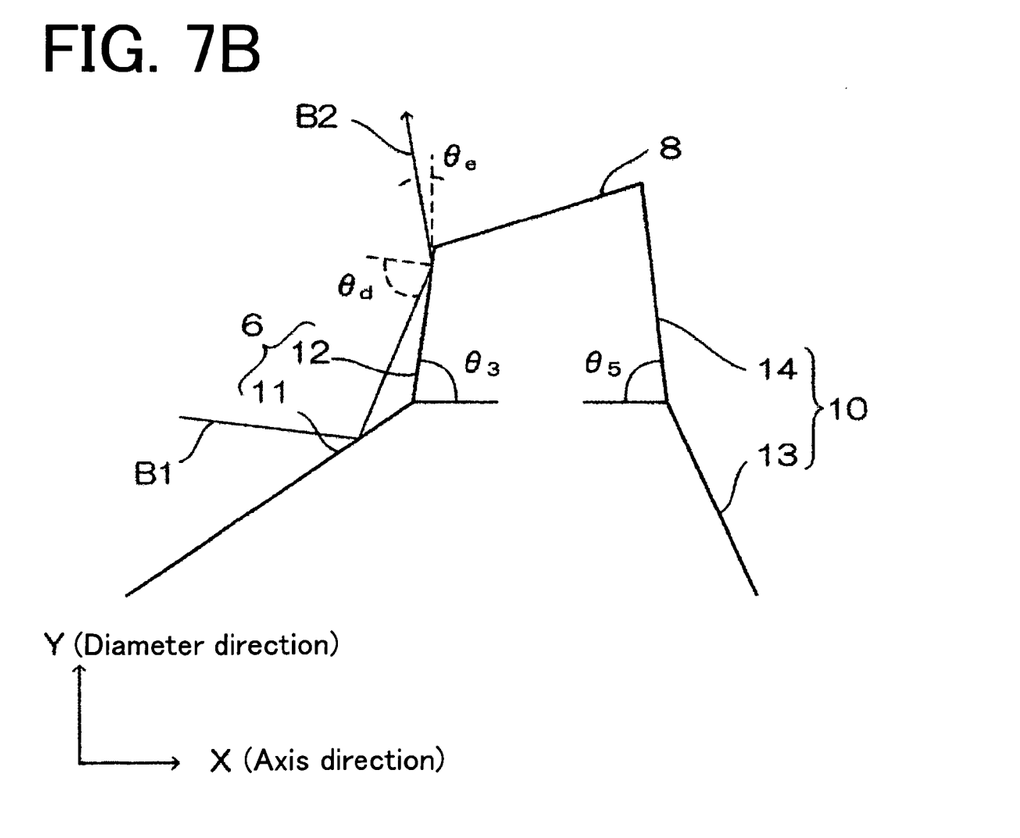

A third embodiment of the present light guiding member and linear light source apparatus will be described below. FIGS. 7A and 7B are partial enlarged sectional views of a recess 7 of the knurled recess portion 5 of the light guiding member 1 according to the embodiment. FIG. 7A shows a recess formed by inclining the flat face 8 of the recess portion 7a shown in FIG. 6 counterclockwise from the axial direction X. FIG. 7B shows a recess 7b in which inclination angles of the secondary reflective surface 12 and the secondary light transmissive face 14 of the recess 7b shown in FIG. 6 are made so as to be 90 degrees or less, respectively. As shown in FIG. 7A, in the third embodiment, the recess is formed by inclining the flat face 8 of the recess portion 7a of the linear light source apparatus according to the second embodiment counterclockwise from the axial direction X. The flat face 8 is formed by rotating the flat face 8 shown in FIG. 6 extending in the axial direction X, counterclockwise slightly, around an apex of the flat face 8 and the reflective surface 6 as a supporting point. As compared with the case where the flat face 8 is parallel to the axial direction X, when the light ray A1 enters the flat face 8, the incident angle $\theta_a$ becomes small. A light ray A1 is fully reflected at an angle corresponding to the incident angle $\theta_a$ on the flat face 8, thereby turning into a light ray A2. The light ray A2 having an angle $\theta_b$ with respect to the axial direction X becomes large, compared with the case where the flat face 8 is parallel to the axial direction X, so that the angle component in the diameter direction Y of the light ray A2 can be made large.

As shown in FIG. 7B, in the recess 7b of the third embodiment, inclination angles of the secondary reflective surface 12 and the second light transmissive face 14 of the recess portion 7b of the linear light source apparatus according to the second embodiment are made into 90 degrees or less. In the case where the inclination angle $\theta_3$ of the secondary reflective surface 12 is made into 90 degrees or less, when the light ray B1 is reflected on the primary reflective surface 11 and is incident on the secondary reflective surface 12, the incident angle $\theta_d$ with respect to the secondary reflective surface 12 becomes larger than that in the case where the inclination angle $\theta_3$ of the secondary reflective surface 12 is 90 degrees. Since, an output angle of the light ray B2 reflected on the secondary reflective surface 12, corresponds to the incident angle $\theta_d$, the angle $\theta_e$ from the diameter direction Y becomes small. Compared with the case where the inclination angle $\theta_3$ is 90 degrees, the angle component of the light ray B2 in the counter direction of the axial direction X, becomes small. Since the angle component in the diameter direction Y becomes large, it comes to propagate approximately in the diameter direction Y.

The preceding description has been presented only to illustrate and describe exemplary embodiments of the present light guiding member and linear light source apparatus. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A light guiding member in a shape of a rod shape comprising:
   a light receiving portion formed on an end of the rod-shaped light guiding member in an axial direction of the rod-shaped light guiding member; and
   a knurled recess portion which extends in the axial direction, is formed on a side face thereof,
   wherein the knurled recess portion has two or more recesses,
   a side face of each recess in a light receiving portion side is a reflective surface,
   the reflective surface of at least one of the recesses having a primary reflective surface and a secondary reflective surface,
   wherein the secondary reflective surface is formed at an end of the primary reflective surface in the axial direction, and an inclination angle with respect to the axial direction of the secondary reflective surface is larger than that of the primary reflective surface.

2. The light guiding member according to claim 1, wherein at least one of the recesses has a reflective surface, a flat surface and a light transmissive face, and the light transmissive face comprises a primary light transmissive face and a secondary light transmissive face.

3. A liner light source apparatus comprising:
   the light guiding member according to claim 2; and
   a light source provided so as to face the light receiving portion of the light guiding member.

4. The light guiding member according to claim 2, wherein the primary light transmissive face is formed at an end of the secondary light transmissive face, and an inclination angle of the secondary transmissive face is larger than that of the primary light transmissive face.

5. A liner light source apparatus comprising:
   the light guiding member according to claim 4; and
   a light source provided so as to face the light receiving portion of the light guiding member.

6. The light guiding member according to claim 1, wherein at least one of the recesses has a reflective surface, a flat surface and a light transmissive face, the flat surface inclines counterclockwise from the axial direction.

7. A liner light source apparatus comprising:
   the light guiding member according to claim 6; and a light source provided so as to face the light receiving portion of the light guiding member.

8. The light guiding member according to claim 1, wherein widths of the flat surfaces in the axial direction are shorter as away from at an opposite end of the light receiving portion to the other end in an axial direction of the light guide member.

9. The light guiding member according to claim 1, wherein each recess defines a depth and the depths of the recesses of forming the knurled recess portion are larger from the light receiving portion as close to the other end in an axial direction.

10. The light guiding member according to claim 1, wherein one of the two or more recesses of the knurled recess portion has an one face reflective surface made up of one face, and another one of the two or more recesses of the knurled recess portion has a two face reflective surface made up of a primary reflective surface and a secondary reflective surface.

11. The light guiding member according to claim 10, wherein the one of the two or more recesses of the knurled recess portion which has the one face reflective surface, and the another one of the two or more recesses of the knurled recess portion which has the two face reflective surface made are formed by turns.

12. The light guiding member according to claim 1, wherein the two face reflective surface is formed only adjacent to an opposite end of the light receiving portion.

13. A liner light source apparatus comprising:
the light guiding member according to claim 1; and
a light source provided so as to face the light receiving portion of the light guiding member.

* * * * *